United States Patent
Hoshina

(10) Patent No.: US 11,805,313 B2
(45) Date of Patent: Oct. 31, 2023

(54) TERMINAL APPARATUS HAVING POWER-SAVING MODE, METHOD OF CONTROLLING SAME, AND STORAGE MEDIUM

(71) Applicant: CANON KABUSHIKI KAISHA, Tokyo (JP)

(72) Inventor: Takayuki Hoshina, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/838,348

(22) Filed: Jun. 13, 2022

(65) Prior Publication Data

US 2022/0417444 A1  Dec. 29, 2022

(30) Foreign Application Priority Data

Jun. 23, 2021 (JP) ................................. 2021-104161

(51) Int. Cl.
H04N 23/65  (2023.01)
H04N 23/53  (2023.01)
H04N 23/667  (2023.01)

(52) U.S. Cl.
CPC ........... *H04N 23/651* (2023.01); *H04N 23/53* (2023.01); *H04N 23/667* (2023.01)

(58) Field of Classification Search
CPC .... H04N 23/651; H04N 23/53; H04N 23/667; Y02D 30/70
See application file for complete search history.

(56) References Cited

U.S. PATENT DOCUMENTS

| | | | |
|---|---|---|---|
| 7,800,044 B1* | 9/2010 | Kahn | H04M 1/67 455/565 |
| 9,094,539 B1* | 7/2015 | Noble | H04N 7/00 |
| 2010/0313050 A1* | 12/2010 | Harrat | H04W 52/0293 713/323 |
| 2013/0196594 A1* | 8/2013 | Moosavi | H04M 1/72412 455/41.1 |
| 2014/0025973 A1* | 1/2014 | Schillings | G06N 3/08 713/323 |
| 2014/0187264 A1* | 7/2014 | Min | H04W 48/16 455/456.2 |

(Continued)

FOREIGN PATENT DOCUMENTS

| | | |
|---|---|---|
| JP | 2012-165243 A | 8/2012 |
| JP | 2014-147125 A | 8/2014 |

*Primary Examiner* — Timothy J Henn
(74) *Attorney, Agent, or Firm* — Cowan, Liebowitz & Latman, P.C.

(57) ABSTRACT

A terminal apparatus capable of shifting to a power-saving mode with high accuracy in a case where a user puts the terminal apparatus in a bag or pocket A luminance distribution acquisition section acquires luminance distribution around the terminal apparatus. A storage area stores a learned model generated from time series information including the luminance distribution acquired by the luminance distribution acquisition section. A determination section determines, based on the time series information and the learned model, whether a user operation of the terminal apparatus has been terminated or in progress. A power supply section shifts the terminal apparatus to the power-saving mode according to a result of the determination performed by the determination section.

11 Claims, 10 Drawing Sheets

(56) References Cited

U.S. PATENT DOCUMENTS

| | | | |
|---|---|---|---|
| 2014/0317429 A1* | 10/2014 | Wang | G06F 1/3231 |
| | | | 713/323 |
| 2016/0212710 A1* | 7/2016 | Ting | H04W 52/028 |
| 2023/0125956 A1* | 4/2023 | Wang | H04W 76/10 |
| | | | 370/329 |

* cited by examiner

FIG. 4

| LEARNING DATA ID | INPUT DATA | | TEACHER DATA |
| --- | --- | --- | --- |
| | TIME SERIES LUMINANCE DISTRIBUTION INFORMATION | TIME SERIES MOTION SENSOR INFORMATION | UNUSED STATE DETERMINATION |
| 1 | BD_01 | ACC_01 | TRUE |
| 2 | BD_02 | ACC_02 | FALSE |
| 3 | BD_03 | ACC_03 | TRUE |
| 4 | BD_04 | ACC_04 | FALSE |
| ⋮ | ⋮ | ⋮ | ⋮ |
| N | BD_N | ACC_N | FALSE |

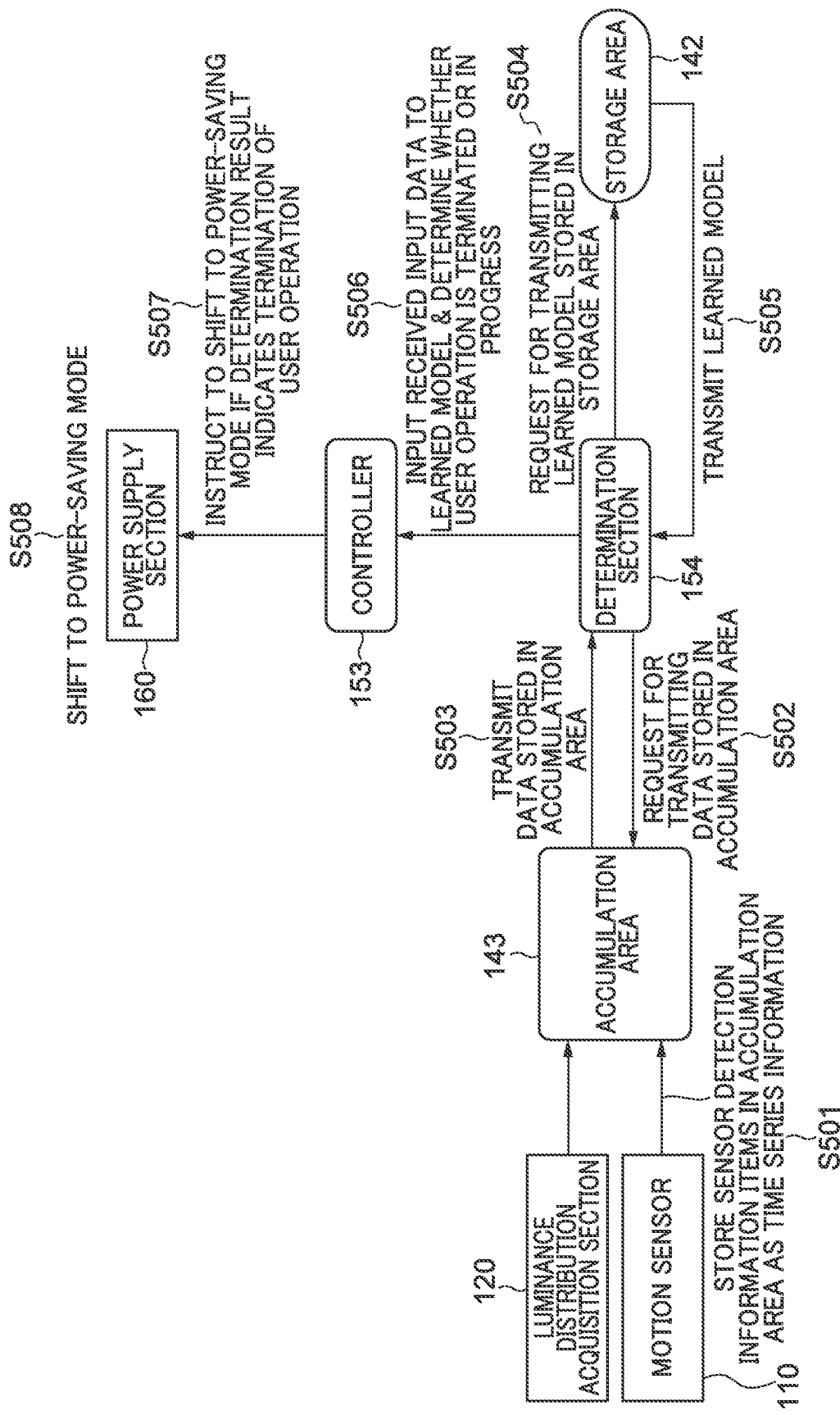

FIG. 7B
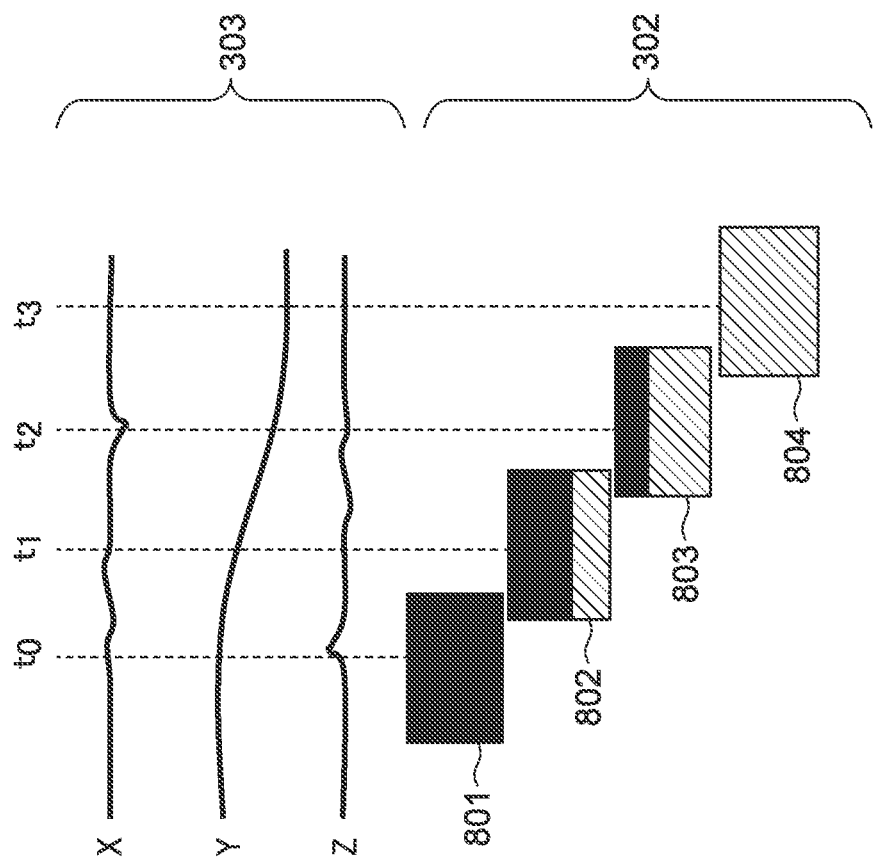
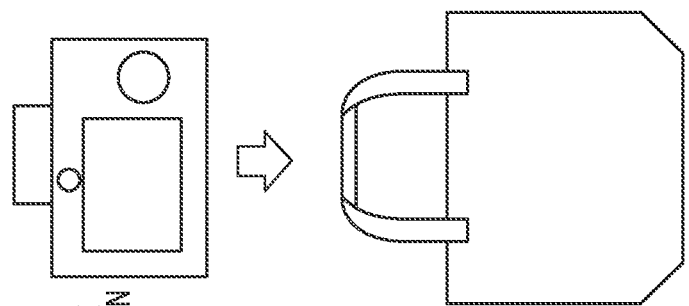

TERMINAL APPARATUS HAVING POWER-SAVING MODE, METHOD OF CONTROLLING SAME, AND STORAGE MEDIUM

BACKGROUND OF THE INVENTION

Field of the Invention

The present invention relates to a terminal apparatus, a method of controlling the same, and a storage medium, and more particularly to a terminal apparatus having a power-saving mode, a method of controlling the same, and a storage medium.

Description of the Related Art

It is necessary to reduce power consumption to extend an available time of a terminal apparatus, such as a camera, but a user sometimes unintentionally keeps the power on when he/she is not operating the terminal apparatus. As a result, a problem is caused that a battery of the terminal apparatus gets exhausted earlier.

Particularly, in a case where the user carries the terminal apparatus in a bag or pocket, if the power is kept on, unnecessary electric power is consumed although it is clear that the user is not operating the terminal apparatus, which adversely affects the available time of the terminal apparatus.

Here, there is a conventional technique of shifting a terminal apparatus to a power-saving mode in a case where the terminal apparatus has not been operated for a certain time period. However, this technique has a problem that if an operation section of the terminal apparatus touches something in a bag, or a proximity sensor of the terminal apparatus reacts, it is determined that some operation has been performed on the terminal apparatus, and the timer counting is cleared, which prevents the terminal apparatus from shifting to the power-saving mode.

To cope with this problem, Japanese Laid-Open Patent Publication (Kokai) No. 2014-147125 discloses a technique of shifting a terminal apparatus to the power-saving mode, in a case where an illuminance measured by an illuminance sensor provided on the terminal apparatus becomes equal to or lower than a predetermined threshold value.

Further, Japanese Laid-Open Patent Publication (Kokai) No. 2012-165243 discloses a technique of accumulating posture information of a terminal apparatus and shifting the terminal apparatus to the power-saving mode based on a motion of the terminal apparatus determined based on the accumulated posture information.

However, the technique disclosed in Japanese Laid-Open Patent Publication (Kokai) No. 2014-147125 causes the terminal apparatus to shift to the power-saving mode based only on the determination of whether or not the illuminance obtained by the illuminance sensor is not higher than the predetermined threshold value. However, if only this determination is used, the terminal apparatus is shifted to the power-saving mode at an unintended timing, such as a case where the environmental light becomes dark while a user is operating the terminal apparatus. Further, in a case where the terminal apparatus is put in a bag or the like, a user does not necessarily close the bag, and hence if only this determination is used, the terminal apparatus cannot be always exactly shifted to the power-saving mode at an intended timing.

On the other hand, there is a case where it is impossible to determine whether the motion of the terminal apparatus, which is determined by the technique disclosed in Japanese Laid-Open Patent Publication (Kokai) No. 2012-165243, is a signal of the end of the operation or indicates that the terminal apparatus is being operated. Further, in Japanese Laid-Open Patent Publication (Kokai) No. 2012-165243, the brightness around the terminal apparatus is not taken into account, and hence when the terminal apparatus is put in a bag in a power-on state, the terminal apparatus sometimes cannot be shifted to the power-saving mode.

SUMMARY OF THE INVENTION

The present invention provides a terminal apparatus that is capable of shifting to a power-saving mode with high accuracy in a case where a user puts the terminal apparatus in a bag or pocket, a method of controlling the same, and a storage medium.

In a first aspect of the present invention, there is provided a terminal apparatus including a luminance distribution acquisition unit configured to acquire luminance distribution around the terminal apparatus, a storage area for storing model data generated from time series information including the luminance distribution acquired by the luminance distribution acquisition unit, a determination unit configured to determine, based on the time series information and the model data, whether a user operation of the terminal apparatus has been terminated or in progress, and a power supply control unit configured to shift the terminal apparatus to a power-saving mode according to a result of the determination performed by the determination unit In a second aspect of the present invention, there is provided a method of controlling a terminal apparatus, including acquiring luminance distribution around the terminal apparatus, storing model data generated from time series information including the acquired luminance distribution, determining, based on the time series information and the model data, whether a user operation of the terminal apparatus has been terminated or in progress, and shifting the terminal apparatus to a power-saving mode according to a result of the determination performed by said determining.

According to the present invention, it is possible to shift the terminal apparatus to the power-saving mode with high accuracy in a case where a user puts the terminal apparatus in a bag or pocket.

Further features of the present invention will become apparent from the following description of exemplary embodiments (with reference to the attached drawings).

BRIEF DESCRIPTION OF THE DRAWINGS

FIG. 4 is a conceptual diagram showing a relationship between input data and teacher data which are used for a learning process executed by a learning section appearing in FIG. 1.

FIG. 5 is a diagram useful in explaining a process in an estimation phase, which is performed in the digital camera.

FIG. 7B is a diagram showing an example of the time series luminance distribution information and the time series motion sensor information, which are obtained when the digital camera is put in the bag from the Y-axis direction from a scene where peripheral luminance is low.

DESCRIPTION OF THE EMBODIMENTS

The present invention will now be described in detail below with reference to the accompanying drawings showing embodiments thereof. Note that in an embodiment of the present invention described below, a digital camera 100 will be described as a terminal apparatus by way of example, but this is not limitative. That is, any other terminal apparatus may be used insofar as it is capable of determining whether an operation on the terminal apparatus by a user is terminated or is in progress and shifting the terminal apparatus to a power-saving mode according to a result of the determination. For example, the terminal apparatus may be a smartphone, a wireless phone, a tablet, a laptop personal computer, or the like.

Figure 1:
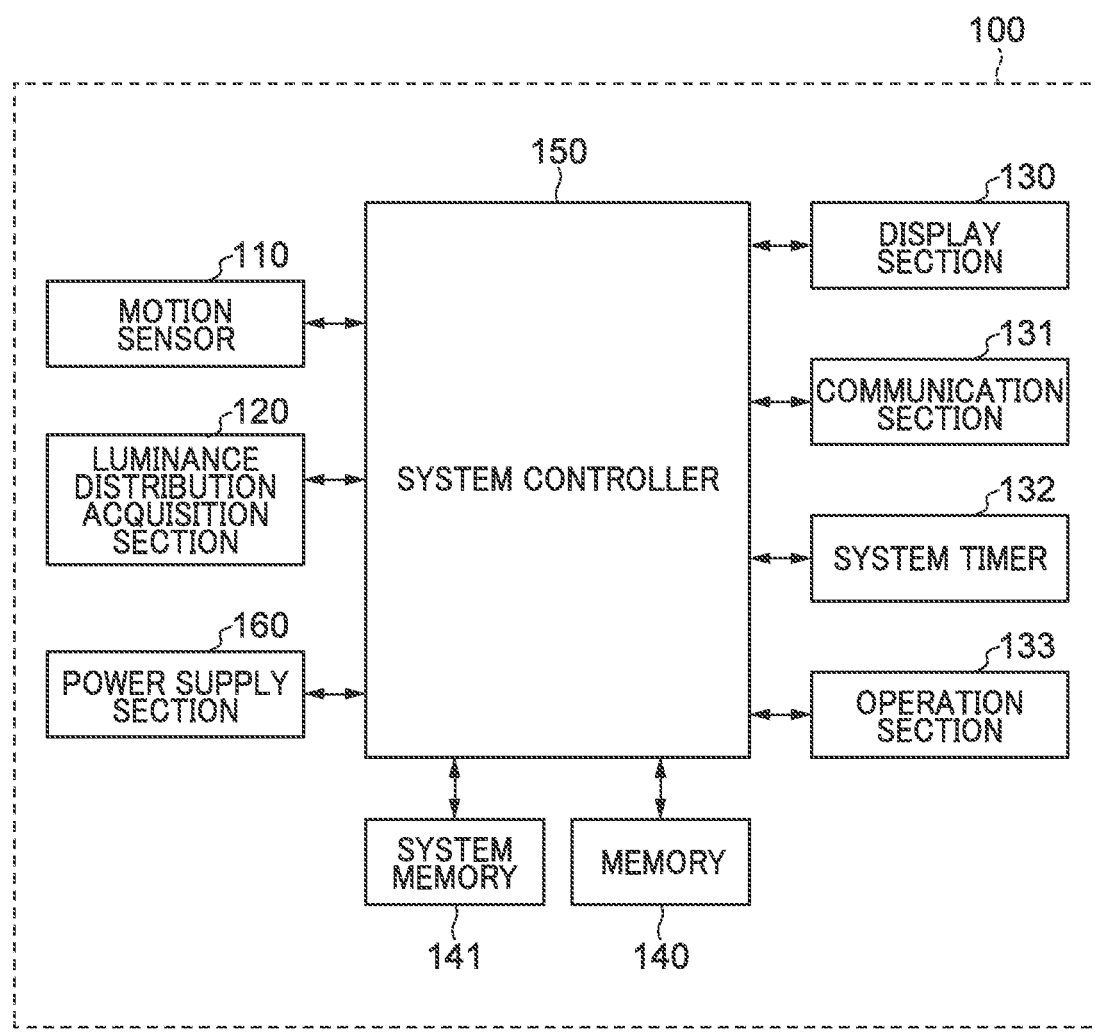
FIG. 1 is a block diagram showing a hardware configuration of a digital camera as a terminal apparatus according to an embodiment of the present invention.

FIG. 1 is a block diagram showing a hardware configuration of the digital camera 100 as the terminal apparatus according to the present embodiment.

The digital camera 100 includes a motion sensor 110, a luminance distribution acquisition section 120, a display section 130, a communication section 131, a system timer 132, an operation section 133, a memory 140, a system memory 141, a system controller 150, and a power supply section 160.

Figure 8:
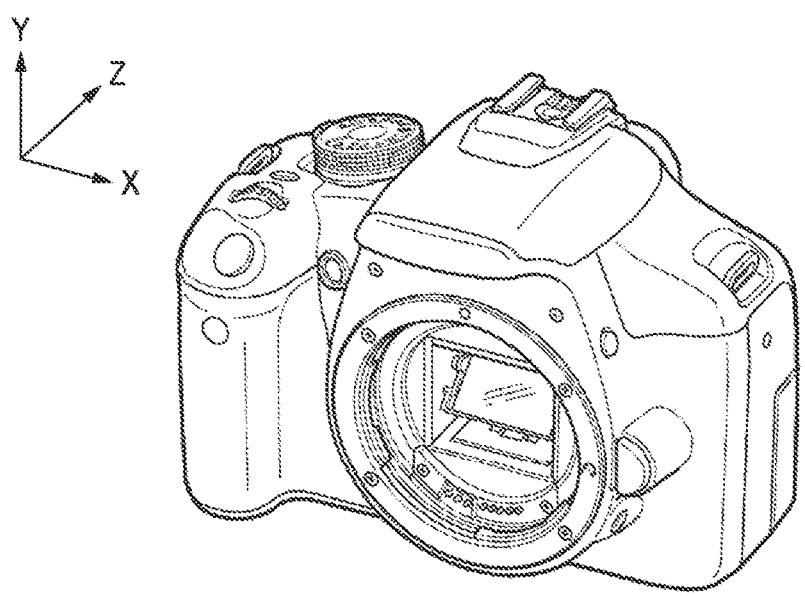
FIG. 8 is a view showing orientations of X, Y, and Z axes of a motion sensor appearing in FIG. 1.

The motion sensor 110 (motion detection unit) is implemented by an acceleration sensor, a gyroscope sensor, or the like, and is configured to detect motion of the digital camera 100 itself and outputs the detected motion as motion information. FIG. 8 shows orientations of an X-axis, a Y-axis, and a Z-axis of the motion sensor 110.

The luminance distribution acquisition section 120 (luminance distribution acquisition unit) is implemented by an image capturing sensor or the like and acquires a luminance distribution around the digital camera 100. The luminance distribution acquisition section 120 forms an optical image of an object through a lens, a diaphragm, a shutter, and the like, none of which are shown, and converts the optical image to electrical signals. Further, the luminance distribution acquisition section 120 is disposed also on the same surface as the display section 130. With this arrangement, when the digital camera 100 is put in a bag or pocket, the luminance distribution acquisition section 120 detects light of backlight illumination of the display section 130, which is reflected in the bag or pocket, as a luminance distribution although the amount of light is very small.

The display section 130 (display unit) is comprised of a display and a backlight. The display is formed e.g. by an organic EL-type or a liquid crystal display-type. For example, in a case where the display is the liquid crystal display type, the display section 130 has a transmissive liquid crystal panel of a thin film transistor (TFT) active matrix driving system. Further, the backlight is a lighting that is fixed on a rear side of the display and lights the display from the rear side. For example, the backlight is comprised of a light source, such as an LED, a fluorescent tube, or an organic EL, and a light-guiding plate, a reflection plate, a diffusion plate, and so forth, for causing surface emission of light from the light source, on the whole display. This surface emission is performed in a case where the digital camera 100 is in an on state and has not been shifted to the power-saving mode.

The communication section 131 is wirelessly connected or connected by a wired cable to transmit and receive video signals and audio signals. Further, the communication section 131 can also be connected to a wireless LAN (Local Area Network) and the Internet.

The system timer 132 measures time used for a variety of controls and time of a built-in clock.

The operation section 133 is an operation unit for inputting a variety of predetermined operation instructions to the system controller 150. The operation section 133 is comprised of a power switch, and one or a combination of a switch, a dial, a touch panel, pointing performed by detecting a line of sight, a voice recognition device, and the like. The state of the power switch (operation unit) is switched to the on state or the off state according to a user operation thereof. Here, when the power switch is switched to the on state, the digital camera 100 is powered on, and when the power switch is switched to the off state, the digital camera 100 is powered off.

As the memory 140, there is used a ROM which is a nonvolatile memory which is electrically storable and erasable, and stores constants, programs, and so forth, for the operation of the system controller 150. The programs mentioned here refer to programs for executing a variety of processes of the present embodiment, described hereinafter. Further, the memory 140 also has a function of storing model data formed by a learned model 301 (see FIG. 3), described hereinafter, which is generated from respective time series information items of luminance distribution information obtained from the luminance distribution acquisition section 120 and motion information obtained from the motion sensor 110.

The system memory 141 is implemented by a RAM into which are loaded constants, programs, and so forth, read from the memory 140, for the operation of the system controller 150. Further, the system memory 141 also has a function of accumulating the respective time series information items of luminance distribution information obtained from the luminance distribution acquisition section 120 and motion information obtained from the motion sensor 110.

The system controller 150 is configured to have at least one processor, such as a CPU and a GPU, and controls the overall operation of the digital camera 100. Note that the GPU is capable of performing efficient calculation by processing more data in parallel and hence it is effective to use the GPU in a case where learning is performed a plurality of times using a learning model, as performed in deep learning. In view of this, in the present embodiment, not only the CPU, but also the GPU is used for processing performed by a learning section 155 (see FIG. 2), described hereinafter, as part of the system controller 150. More specifically, in a case where a learning program including a learning model is executed, learning is performed by calculation executed by cooperation of the CPU and the GPU. Note that in the processing performed by the learning section 155, calculation may be executed by the CPU or GPU alone. Further, the GPU may be similarly used for processing performed by a determination section 154 (see FIG. 2), described hereinafter, as part of the system controller 150.

The power supply section 160 is comprised of a battery, a battery detection circuit, a protection circuit, and a power supply circuit. The power supply section 160 supplies a desired power supply voltage to the components of the digital camera 100 for a desired time period based on a command from the system controller 150. Further, the power supply section 160 has a function of detecting whether or not the battery is attached, a battery type, a battery remaining amount, and so forth, and notifying the system controller 150 of a result of the detection. Further, the power supply section 160 has a function of protecting a load circuit connected to the power supply circuit by shutting off electric power when a power supply abnormality, such as over current and overvoltage, is detected. The power supply circuit is formed by a DC-DC converter, particularly an LDO regulator.

Figure 2:
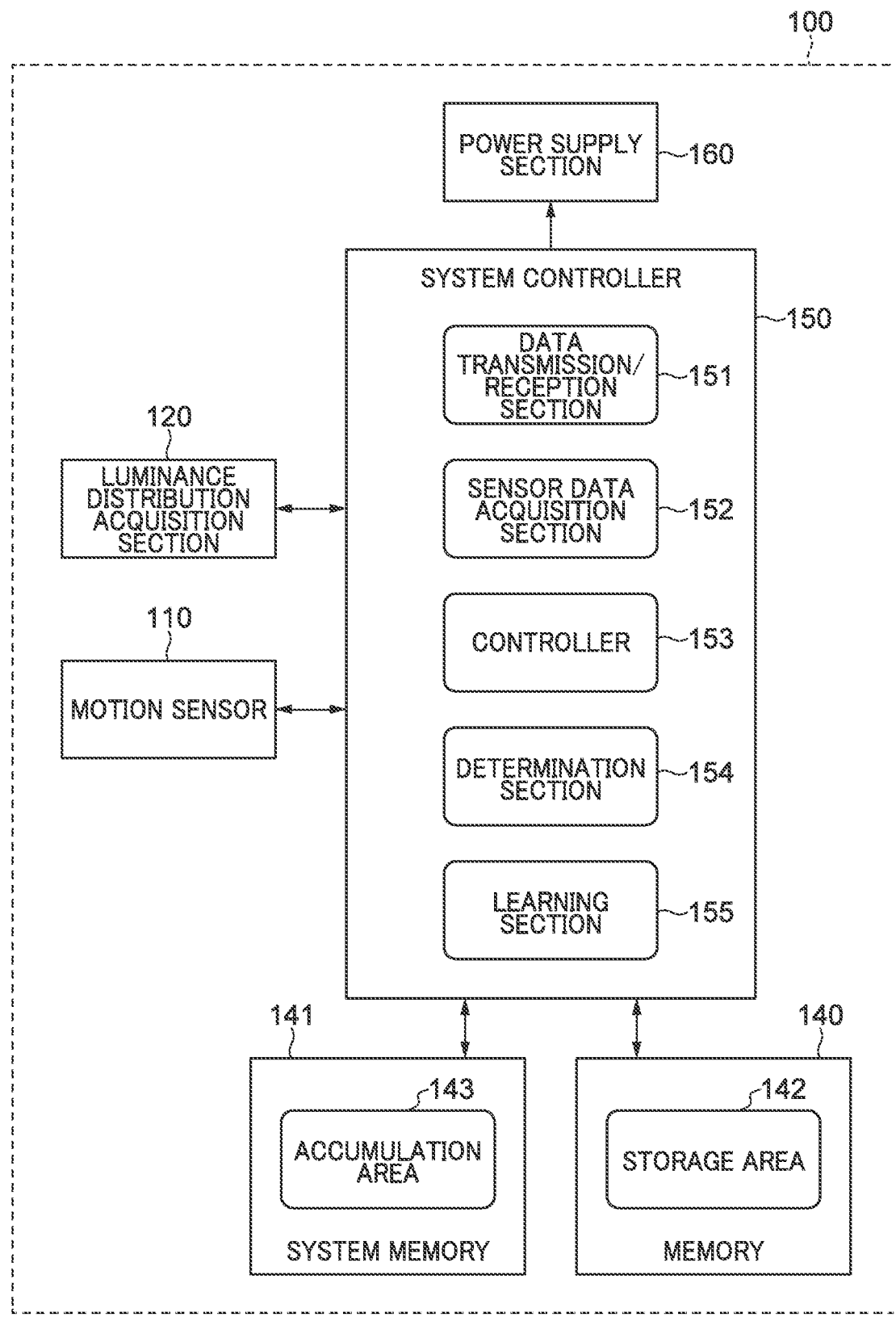
FIG. 2 is a block diagram showing a detailed configuration of a system controller, a system memory, and a memory, appearing in FIG. 1.

Next, details of the system controller 150, the system memory 141, and the memory 140 will be described with reference to FIG. 2.

The system controller 150 includes a data transmission/reception section 151, a sensor data acquisition section 152, a controller 153, the determination section 154, and the learning section 155.

The sensor data acquisition section 152 (generation unit) periodically acquires luminance distribution information from the luminance distribution acquisition section 120 and motion information from the motion sensor 110 (hereinafter referred to as the "respective sensor detection information items") at a predetermined sampling rate and generates respective time series information items of the luminance distribution information and the motion information. The sensor data acquisition section 152 further controls transmitting these generated time series information items of the respective sensor detection information items to an accumulation area 143 of the system memory 141 via the data transmission/reception section 151, for storage therein.

The data transmission/reception section 151 performs transmission/reception of data between the system controller 150 and blocks of the digital camera 100, other than the luminance distribution acquisition section 120 and the motion sensor 110. For example, to pass the learned model 301 used for estimation to the determination section 154, the data transmission/reception section 151 controls receiving the learned model 301 from a storage area 142 of the memory 140 and transmitting the received learned model 301 to the determination section 154. Further, the data transmission/reception section 151 controls receiving the time series information items of the respective sensor detection information items, which are stored in the accumulation area 143 of the system memory 141, and transmitting the received information items to the learning section 155 and the determination section 154. Further, the data transmission/reception section 151 receives a command for shifting to the power-saving mode from the determination section 154 and transmits the received command to the power supply section 160.

The accumulation area 143 of the system memory 141 is formed by a finite buffer or the like and the time series information items of the respective sensor detection information items, which are transmitted from the sensor data acquisition section 152, are stored in the accumulation area 143. Further, from the accumulation area 143, the time series information items of the respective sensor detection information items are transmitted to the determination section 154 in response to a data transmission request received from the determination section 154.

The storage area 142 of the memory 140 stores the constants and the programs for the operation of the system controller 150, for controlling the overall operation of the digital camera 100, and the learned model 301. The storage area 142 transmits the learned model 301 stored therein via the data transmission/reception section 151 in response to a request received from the determination section 154 of the system controller 150, for transmitting the learned model 301. Note that the storage area 142 may store not the learned model 301, but internal parameters of the learned model 301. Further, the storage area 142 may store a rule base list conformant to the learned model 301 and transmit the rule base list when the determination section 154 performs an estimation process.

The controller 153 controls the overall operation of the digital camera 100 by reading the programs for controlling the digital camera 100 from the memory 140 and loading part of the read programs into the system memory 141. Further, the controller 153 issues a command for performing additional learning of the learned model 301 to the learning section 155 (additional learning unit) when a predetermined condition is satisfied.

The determination section 154 (determination unit) performs the estimation process for determining whether or not a user has put the digital camera 100 in a bag (user operation of the digital camera 100 is terminated or in progress) using the CPU or GPU. This estimation process is executed based on the time series information items of the respective sensor detection information items, which are stored in the accumulation area 143 of the system memory 141, and the learned model 301 stored in the storage area 142 of the memory 140. The determination section 154 notifies the controller 153 of a result of this estimation process. In a case where the result of the estimation process notified from the determination section 154 indicates that the user has put the digital camera 100 in the bag, the controller 153 (power supply control unit) transmits a command for shifting to the power-saving mode to the power supply section 160 via the data transmission/reception section 151.

Further, the determination section 154 also determines whether or not the time series information items of the respective sensor detection information items, which are stored in the accumulation area 143 of the system memory 141, satisfy a predetermined condition. If it is determined by the determination section 154 that this predetermined condition is satisfied, the controller 153 determines whether or not the predetermined condition for performing the additional learning by the learning section 155 is satisfied. If it is determined that this predetermined condition for performing the additional learning is satisfied, the controller 153 sends a command for performing the additional learning to the learning section 155. Details of this process will be described hereinafter with reference to FIGS. 6A and 6B.

In a case where the (additional) learning process command is received from the controller 153, the learning section 155 receives the time series information items of the respective sensor detection information items, which are accumulated in the accumulation area 143 of the system memory 141, as input data, and executes the (additional) learning process using the CPU or the GPU.

Further, the learning section 155 may include an error detection section and an update section.

The error detection section determines a difference between output data output from an output layer of a neural network according to the input data (learning data) input to an input layer, and teacher data. The error detection section may calculate a difference between the output data output from the neural network and the teacher data, using a loss function.

The update section updates connection weighting coefficients between nodes of the neural network and the like based on the difference determined by the error detection section such that the difference is reduced. This update section updates the connection weighting coefficients and the like, e.g. by back propagation. The back propagation is a method of adjusting connection weighting coefficients between nodes of the neural network and the like such that the above-mentioned difference is reduced.

Note that the learned model 301 used for the above-mentioned estimation process is only required to be stored in the storage area 142 of the memory 140, and the operation of the present invention can be achieved even when the learning section 155 for executing the learning process for generating this learned model 301 is not provided. Further, the additional learning process performed by the learning section 155, described hereinafter, is necessary for improving the accuracy of the present invention, but is not an essential element of the present invention.

The power supply section 160 executes power supply control based on a command received from the controller 153.

Next, details of estimation performed by the determination section 154 using the learned model 301 will be described with reference to FIGS. 3 and 4.

Figure 3:
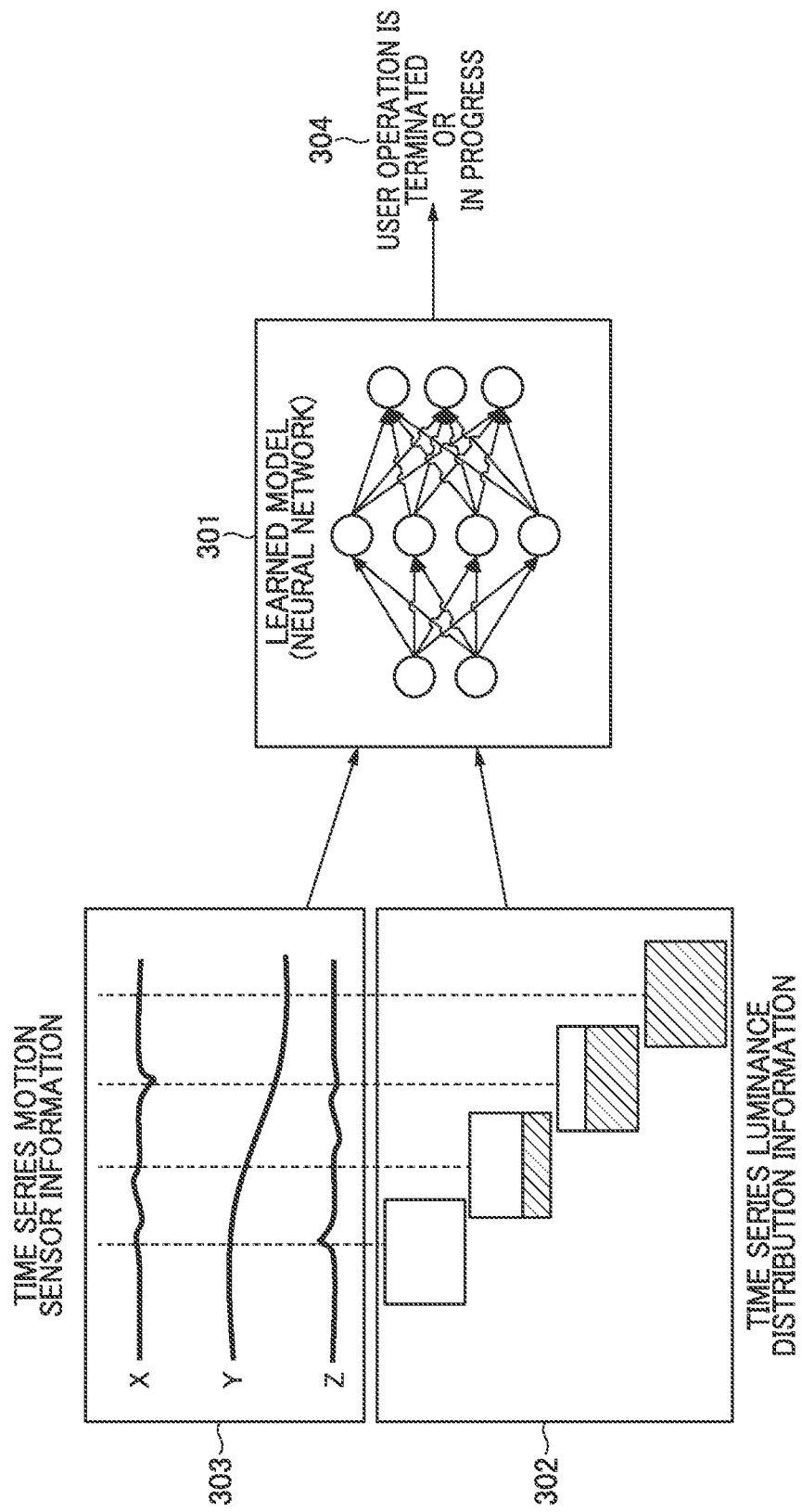
FIG. 3 is a conceptual diagram of an estimation process using a learned model, which is executed by a determination section appearing in FIG. 1.

FIG. 3 is a conceptual diagram of the estimation process using the learned model 301, which is performed by the determination section 154.

The learned model 301 is a neural network learned by the learning process (machine learning) executed by the learning section 155. Note that the learned model 301 is not limited to the neural network insofar as it is obtained by machine learning, and may be based on a nearest neighbor algorithm, a naive Bayes method, a decision tree method, a support vector machine, or the like. Further, the learning method may use deep learning that generates feature amounts for learning and connection weighting coefficients, by itself using a neural network. Further, in the present embodiment, data of the time series information items of the respective sensor detection information items, which temporally changes, is used as the input data, and hence it is also preferable to use a RNN (recursive neural network).

Time series luminance distribution information 302 is one of the input data items input to the learned model 301 and is the time series information of the luminance distribution information acquired by the luminance distribution acquisition section 120 of the digital camera 100.

Time series motion sensor information 303 is one of the input data items input to the learned model 301, which is the time series information of the motion information acquired by the motion sensor 110 of the digital camera 100.

Output data 304 is data output when the determination section 154 inputs the time series luminance distribution information 302 and the time series motion sensor information 303 to the learned model 301 and executes the estimation process using the learned model 301. The output data 304 includes a result of the determination of whether a user operation of the digital camera 100 has been terminated by putting the digital camera 100 in a bag (or pocket, etc.) or is in progress.

FIG. 4 is a conceptual diagram showing a relationship between the input data (learning data) and teacher data, which are used for the learning process executed by the learning section 155.

As shown in FIG. 4, the time series luminance distribution information 302 and the time series motion sensor information 303 as the input data form, for example, as indicated in a row 401 in FIG. 4, a set of the time series luminance distribution information (BD_01) and the time series motion sensor information (ACC_01).

These time series luminance distribution information (BD_01) and time series motion sensor information (ACC_01) are information items acquired by the luminance distribution acquisition section 120 and the motion sensor 110 at the same time point, respectively.

Teacher data 402 is data indicating whether a user operation of the digital camera 100 has been terminated by putting the digital camera 100 e.g. in a bag or pocket or is in progress during a time period in which the input data items in the row 401 have been acquired by the luminance distribution acquisition section 120 and the motion sensor 110. More specifically, the teacher data set to True, such as the teacher data 402, indicates that a user operation of the digital camera 100 has been terminated. On the other hand, the teacher data set to False indicates that a user operation of the digital camera 100 is in progress.

Next, a description will be given of a relationship between the time series luminance distribution information 302 and the time series motion sensor information 303, which are used as the input data to be input to the learned model 301 for determining whether or not the digital camera 100 has been put in a bag, with reference to examples shown in FIGS. 7A and 7B.

Figure 7A:
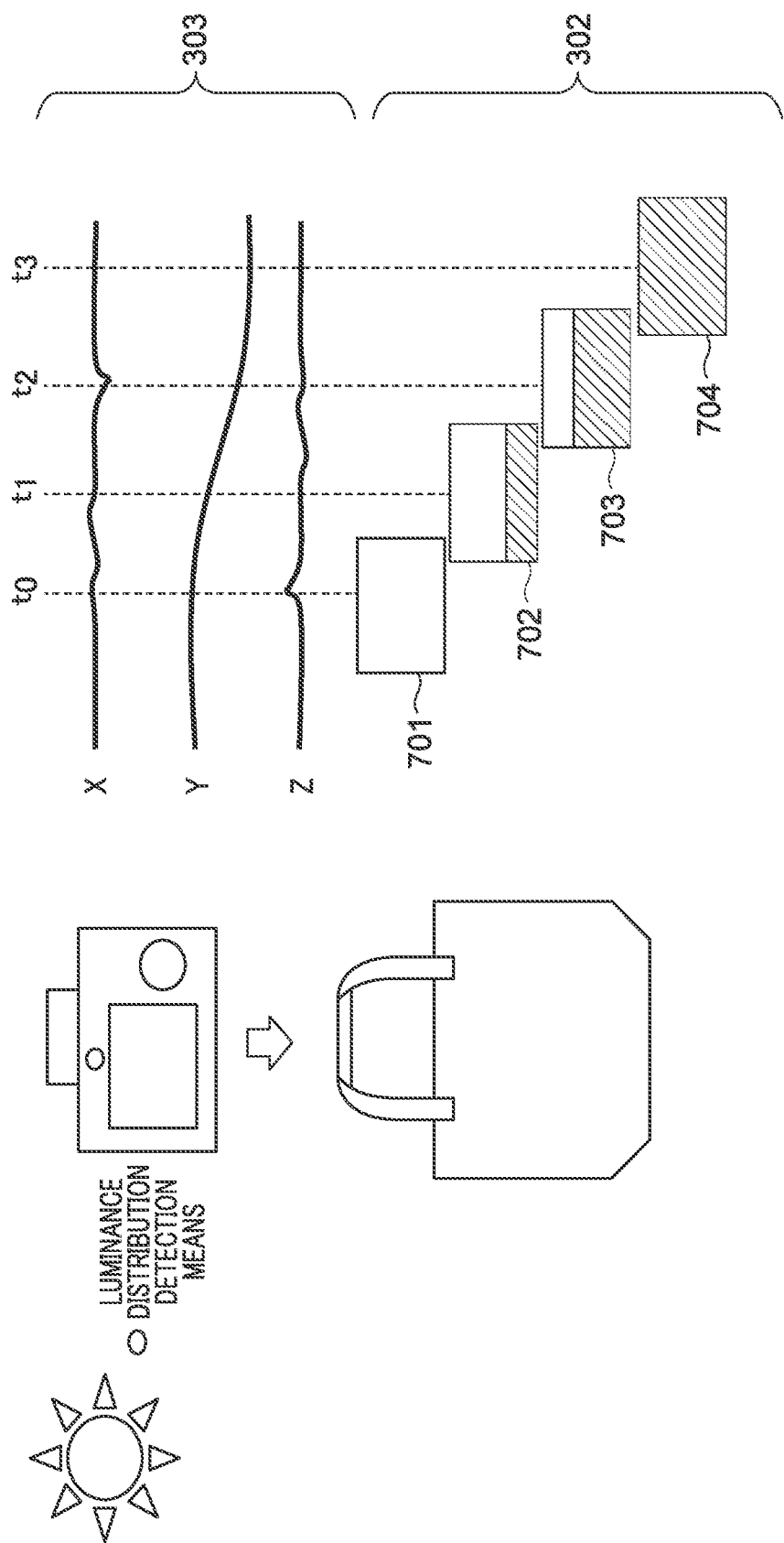
FIG. 7A is a diagram showing an example of time series luminance distribution information and time series motion sensor information, which are obtained when the digital camera is put in a bag from a Y-axis direction from a scene where peripheral luminance is high.

FIG. 7A is a diagram showing an example of the time series luminance distribution information 302 and the time series motion sensor information 303, which were acquired when the digital camera 100 was input in a bag from the Y-axis direction (see FIG. 8) from a scene where the peripheral luminance was high. Here, times $t_0$ to $t_3$ are time points at which the sensor data acquisition section 152 acquired the respective sensor detection information items from the luminance distribution acquisition section 120 and the motion sensor 110 at a predetermined sampling rate. Further, in the illustrated example in FIG. 7A, the user put the digital camera 100 in the bag immediately after the time $t_0$ (times $t_1$ to $t_3$), and the digital camera 100 remained in the bag at the times $t_1$ to $t_3$ and thereafter.

In a case where the peripheral luminance was high, at the time $t_0$ before the user put the digital camera 100 in the bag, luminance distribution 701 acquired by the luminance distribution acquisition section 120 was in a bright state. On the other hand, at the times $t_1$ to $t_3$ which were during user operation of the digital camera 100 for putting the same in the bag and after the user operation, as indicated by luminance distributions 702 to 704 acquired by the luminance distribution acquisition section 120, the luminance distribution became progressively darker from a direction in which the user inserted, i.e. put the digital camera 100 in the bag (hereinafter simply referred to as the insertion direction). After that, finally, as indicated by the luminance distribution 704 at the time $t_3$, the whole distribution was placed in a dark state.

On the other hand, at the times $t_0$ to $t_3$, in the time series motion sensor information 303, changes in acceleration in the Y-axis which is the insertion direction were markedly detected.

As described above, when the digital camera 100 is input in the bag, characteristic temporal changes occur in the time series luminance distribution information 302 and the time series motion sensor information 303. For this reason, it is possible to determine whether or not the user has put the digital camera 100 in the bag, using these characteristic temporal changes.

On the other hand, FIG. 7B is a diagram showing an example of the time series luminance distribution information 302 and the time series motion sensor information 303, which were acquired when the digital camera 100 was inserted, i.e. put in the bag from the Y-axis direction similarly to the example shown in FIG. 7A from a scene where the peripheral luminance was low. Note that similar to FIG. 7A, in the illustrated example in FIG. 7B, the user put the digital camera 100 in the bag immediately after the time t0, and at the times $t_1$ to $t_3$ which were during user operation of the digital camera 100 for putting the same in the bag and after the user operation, the digital camera 100 was in the bag.

In a case where the peripheral luminance was low, at the time $t_0$ before putting the digital camera 100 in the bag, luminance distribution 801 acquired by the luminance distribution acquisition section 120 was in a completely dark state. On the other hand, at the times $t_1$ to $t_3$ which were during user operation of the digital camera 100 for putting the same in the bag and after the user operation, as indicated by luminance distributions 802 to 804 acquired by the luminance distribution acquisition section 120, the luminance distribution became progressively brighter from the insertion direction. After that, finally, as indicated by the luminance distribution 804 at the time $t_3$, the whole distribution was in a slightly bright state. This is because when the digital camera 100 is put in the bag or pocket, the luminance distribution acquisition section 120 arranged on the same surface as the display section 130 can detect light emitted by the backlight of the display section 130 and reflected in the bag or pocket.

On the other hand, at the times $t_0$ to $t_3$, in the time series motion sensor information 303, similar to FIG. 7A, changes in acceleration in the Y-axis which is the insertion direction were markedly detected also in FIG. 7B.

As described above, also in the case where the digital camera 100 is put in the bag from a dark scene, characteristic temporal changes occur in the time series luminance distribution information 302 and the time series motion sensor information 303. Therefore, it is possible to determine whether or not the user has put the digital camera 100 in the bag, using these characteristic temporal changes.

Next, a process in an estimation phase in the digital camera 100 will be described with reference to FIG. 5.

First, in a step S501, the sensor data acquisition section 152 periodically acquires sensor detection information items from the luminance distribution acquisition section 120 and the motion sensor 110, respectively, at a predetermined sampling rate and stores the acquired information items in the accumulation area 143.

In a step S502, the determination section 154 requests transmission of the input data, more specifically, the respective sensor time series information items (the time series luminance distribution information 302 and the time series motion sensor information 303) from the accumulation area 143.

In a step S503, according to the transmission request from the determination section 154 in the step S502, the respective sensor time series information items (the time series luminance distribution information 302 and the time series motion sensor information 303) are transmitted to the determination section 154 from the accumulation area 143.

In a step S504, the determination section 154 requests transmission of the learned model 301 from the storage area 142.

In a step S505, according to the transmission request received from the determination section 154 in the step S504, the learned model 301 is transmitted from the storage area 142 to the determination section 154.

In a step S506, the determination section 154 performs the estimation process based on the learned model 301 received from the storage area 142 and the input data received in the step S503. With this estimation process, whether or not the user has put the digital camera 100 in the bag (or pocket) (user operation of the digital camera 100 has been terminated or in progress) is determined. Then, the determination section 154 transmits a result of the determination of the estimation process to the controller 153.

In a step S507, if a result of the determination indicating that the user has put the digital camera 100 in the bag (or pocket) (user operation of the digital camera 100 has been terminated) is received from the determination section 154 in the step S506, the controller 153 sends a command for shifting to the power-saving mode to the power supply section 160.

In a step S508, the power supply section 160 executes power supply control based on the command received from the controller 153 in the step S507 and shifts to the power-saving mode.

Thus, as a result of the estimation process using the learned model 301 and the input data, when it is determined that the user has put the digital camera 100 in the bag (or pocket) (user operation of the digital camera 100 has been terminated), it is possible to quickly shift the power supply section 160 to the power-saving mode. This makes it possible to obtain an advantageous effect that it is possible to improve preservation of the battery of the terminal apparatus.

Next, with reference to FIGS. 6A and 6B, a description will be given of a process in the estimation phase and a process in a learning phase (additional learning process) in a case where the power supply section 160 is not shifted to the power-saving mode in the process in the estimation phase, which are performed by the digital camera 100.

Figure 6A:
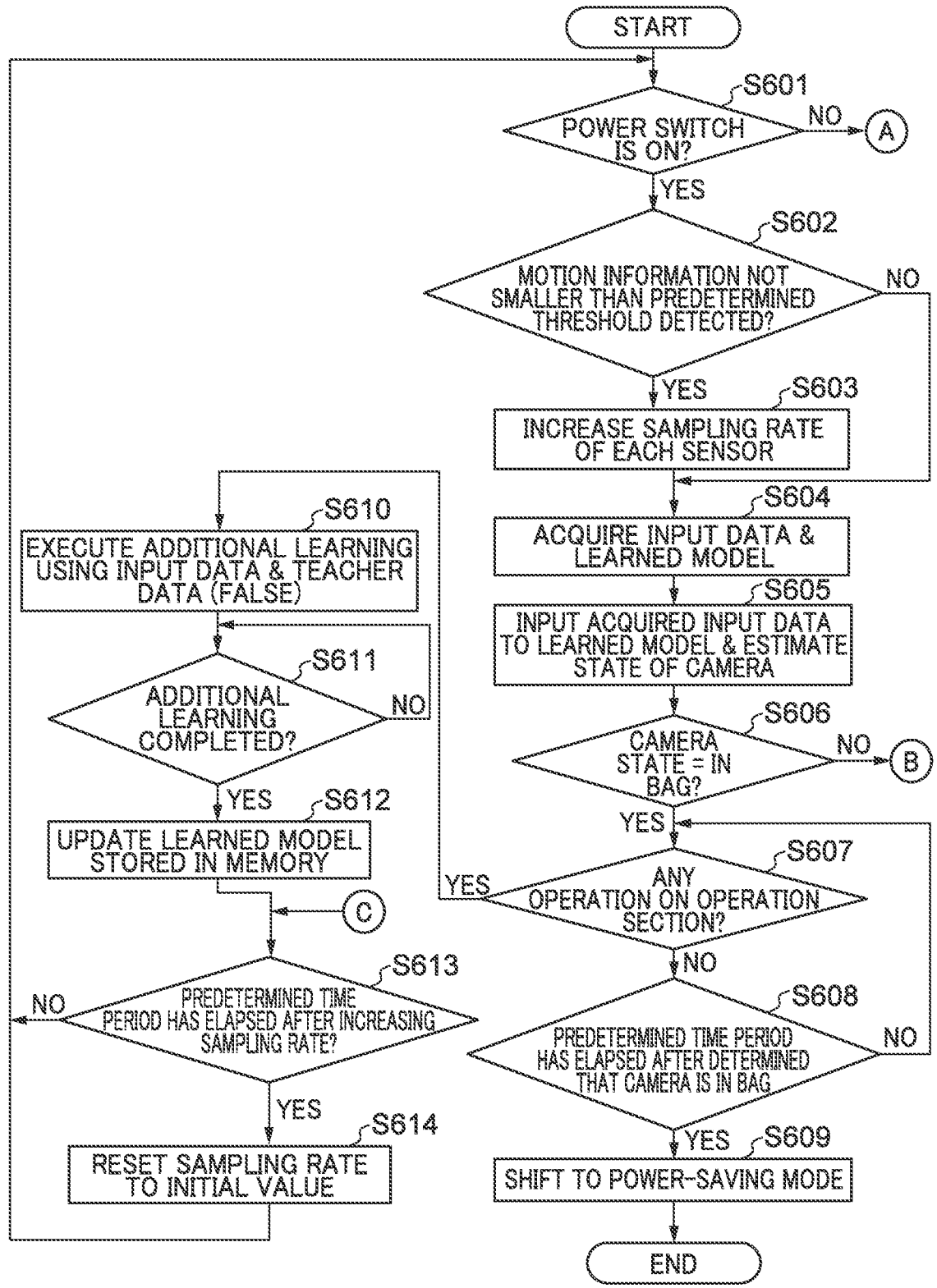
FIG. 6A is a flowchart of the process in the estimation phase and a process in a learning phase, which are performed in the digital camera.

Referring to FIG. 6A, first, in a step S601, the controller 153 determines whether the power switch of the operation section 133 is in the on state or the off state. If it is determined that the power switch is in the on state (YES to the step S601), the process proceeds to a step S602. On the other hand, if the power switch has been switched from the on state to the off state according to a user operation (NO to the step S601), the process proceeds to a step S621 (see FIG. 6B).

In the step S602, the controller 153 determines whether or not the motion sensor 110 has detected a change in motion information, which is equal to or larger than a predetermined threshold value. If it is determined that the change has been detected (YES to the step S602), the process proceeds to a step S603. On the other hand, if it is determined that the change has not been detected (NO to the step S602), the process proceeds to a step S604.

In the step S603, the controller 153 increases the sampling rate at which the sensor data acquisition section 152 acquires the respective sensor detection information items from the luminance distribution acquisition section 120 and the motion sensor 110, from the initial value of the sampling rate. Note that although in the present embodiment, the sampling rate is increased for both of the luminance distribution acquisition section 120 and the motion sensor 110, this is not limitative, but the sampling rate is only required to be increased for at least one of them.

Here, the sampling rate is increased in the step S603 because there is a high possibility that when the user puts the digital camera 100 in a bag or a pocket, a change in motion information (change in acceleration) equal to or larger than the predetermined threshold value occurs. With this, it is possible to improve the accuracy of the estimation process performed by the determination section 154. On the other hand, in a case where a change in motion information equal to or larger than the predetermined threshold value is not detected, there is a low possibility that the user has put the digital camera 100 in a bag or a pocket, and hence the sampling rate is not increased but held at the initial value. With this, it is possible to suppress the power consumption of the luminance distribution acquisition section 120 and the sensor data acquisition section 152.

In the step S604, the determination section 154 acquires the time series luminance distribution information 302 and the time series motion sensor information 303, which have been accumulated in the accumulation area 143 of the system memory 141, as the input data. Further, the determination section 154 acquires the learned model 301 stored in the storage area 142 of the memory 140.

In a step S605, the determination section 154 inputs the input data (the time series luminance distribution information 302 and the time series motion sensor information 303) to the learned model 301 and acquires the output data 304. The input data (the time series luminance distribution information 302 and the time series motion sensor information 303) is hereinafter denoted as the input data (302 and 303). After that, the determination section 154 notifies the controller 153 of the acquired output data 304.

In a step S606, the controller 153 determines whether or not the output data notified from the determination section 154 in the step S605 indicates that the user has put the digital camera 100 in the bag (user operation of the digital camera 100 has been terminated). If it is determined in the step S606 that the user has put the digital camera 100 in the bag (user operation of the digital camera 100 has been terminated: a second condition is satisfied) (YES to the step S606), the process proceeds to a step S607. On the other hand, if it is determined that the user has not put the digital camera 100 in the bag (user operation of the digital camera 100 in progress) (NO to the step S606), the process proceeds to a step S615 (see FIG. 6B).

In the step S607, the controller 153 determines whether or not a user operation on the operation section 133 has been performed based on a signal output from the operation section 133. If it is determined in the step S607 that no user operation on the operation section 133 has been performed (NO to the step S607), the process proceeds to a step S608. On the other hand, if it is determined that a user operation on the operation section 133 has been performed (YES to the step S607), it is determined that in spite of being determined in the step S606 that the digital camera 100 is in an intrinsically non-operated state (the digital camera 100 is in the bag), a user operation on the operation section 133 has been performed, and hence the process proceeds to a step S610 to execute the additional learning process.

In the step S608, the controller 153 determines, using the system timer 132, whether or not a predetermine time period (second time period) has elapsed after it is determined in the step S606 that the user has put the digital camera 100 in the bag. If it is determined that the predetermine time period has elapsed (YES to the step S608), the process proceeds to a step S609. On the other hand, if it is determined that the predetermine time period has not elapsed (NO to the step S608), the process returns to the step S607.

In the step S609, the controller 153 restores the sampling rate increased in the step S603 to the initial value and sends a command for shifting to the power-saving mode to the power supply section 160. When the power supply section 160 shifts to the power-saving mode according to this command, the present process is terminated.

In the step S610, the controller 153 generates teacher data indicating that a user operation of the digital camera is in progress (False) with respect to the input data (302 and 303) acquired in the step S604. After that, the controller 153 sends a command for updating the learned model 301 by the additional learning using the input data and the generated teacher data to the learning section 155. The learning section 155 executes the additional learning process for updating the learned model held by the learning section 155 using the input data (302 and 303) and the generated teacher data according to the command received from the controller 153.

In a step S611, the controller 153 determines whether or not the additional learning process by the learning section 155 has been completed. If it is determined that the additional learning process has been completed (YES to the step S611), the process proceeds to a step S612. On the other hand, if it is determined that the additional learning process has not been completed (NO to the step S611), the determination in the step S611 is repeated.

In the step S612, the learning section 155 updates the learned model 301 stored in the storage area 142 of the memory 140 with the updated learned model held by the learning section 155.

In a step S613, the controller 153 determines, using the system timer 132, whether or not a predetermined time period has elapsed after the sampling rate has been increased in the step S603. If it is determined that the predetermined time period has elapsed (YES to the step S613), the process proceeds to a step S614, wherein the controller 153 resets the sampling rate to the initial value, and the process returns to the step S601. On the other hand, if it is determined that the predetermined time period has not elapsed (NO to the step S613), the same operation is repeated from the step S601.

Figure 6B:
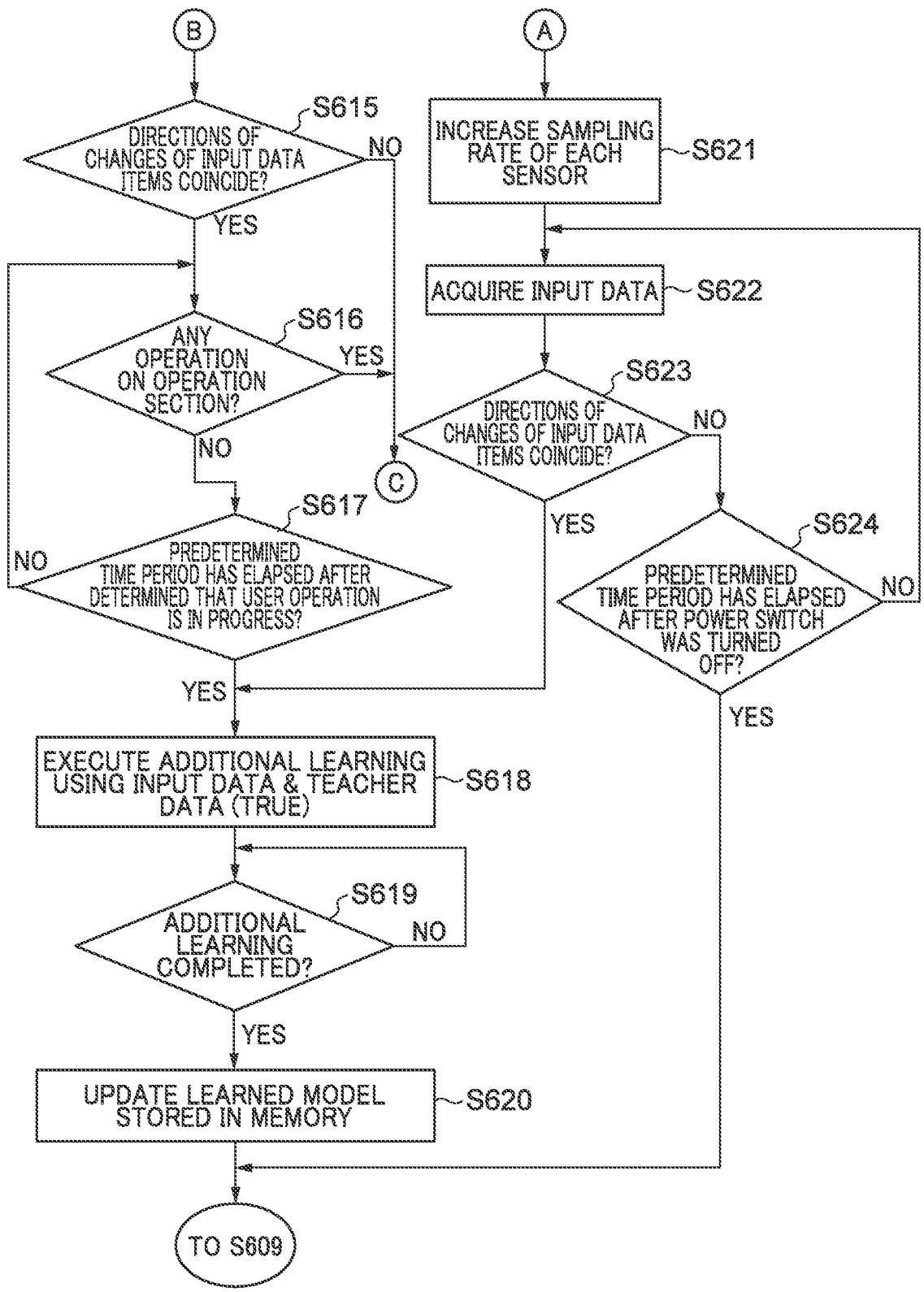
FIG. 6B is a continuation of the flowchart in FIG. 6A.

Referring to FIG. 6B, in the step S615, the determination section 154 determines whether or not the respective directions in which the input data items (302 and 303) acquired in the step S605 have changed coincide with each other. If it is determined that the respective directions in which the input data items (302 and 303) have changed coincide with each other (a first condition is satisfied) (YES to the step S615), the process proceeds to a step S616. On the other hand, if it is determined that the respective directions in the changes do not coincide with each other (NO to the step S615), the process proceeds to the step S613.

Here, as shown in FIGS. 7A and 7B, in a case where the user has put the digital camera 100 in the bag vertically from the Y-axis direction, the change in acceleration in the Y-axis direction becomes large, and the luminance distribution also progressively changes from the Y-axis direction. That is, in a case where the respective directions in which the input data items (302 and 303) acquired in the step S605 have changed coincide with each other, the determination result obtained in the step S606, indicating that the user has not put the digital camera 100 in the bag (user operation of the digital camera 100 is in progress), is an error, and there is a possibility that actually, the user has put the digital camera 100 in the bag. For example, a case is possible where when the user has put the digital camera 100 in the bag, the operation section 133 has touched something, which caused determination in the step S606 that the user operation of the digital camera 100 is in progress. So, in the following steps, in a case where such a possibility is high, the additional learning for updating the learned model 301 is performed using the input data and the teacher data indicating that the use operation of the digital camera 100 has been terminated (True).

In the step S616, the controller 153 determines, based on a signal output from the operation section 133, whether or not a user operation of the digital camera 100 has been performed on the operation section 133. If it is determined in the step S616 that no user operation has been performed (NO to the step S616), the process proceeds to a step S617. On the other hand, if it is determined that a user operation has been performed (YES to the step S616), the process returns to the step S613.

In the step S617, the controller 153 determines, using the system timer 132, whether or not a predetermined time (first time period) has elapsed after it was determined in the step S606 that a user operation of the digital camera 100 was in progress. If it is determined that the predetermined time period has elapsed (YES to the step S617), the process proceeds to a step S618. On the other hand, if it is determined that the predetermined time period has not elapsed (NO to the step S617), the process returns to the step S616.

In the step S618, the controller 153 generates teacher data indicating that the user has put the digital camera 100 in the bag, i.e. the user operation of the digital camera 100 has been terminated (True) with respect to the input data (302 and 303), for the learning section 155. After that, the controller 153 sends a command for updating the learned model 301 by the additional learning using the input data and the generated teacher data, to the learning section 155. The learning section 155 executes the additional learning process for updating the learned model 301 held by the learning section 155, using the input data (302 and 303) and the generated teacher data, based on this command received from the controller 153.

In a step S619, the controller 153 determines whether or not the additional learning process by the learning section 155 has been completed. If it is determined that the additional learning process has been completed (YES to the step S619), the process proceeds to a step S620. On the other hand, if it is determined that the additional learning process has not been completed (NO to the step S619), the determination in the step S619 is repeated.

In the step S620, the learning section 155 updates the learned model 301 stored in the storage area 142 of the memory 140 with the updated learned model held by the learning section 155 and proceeds to the step S609.

In the step S621, the controller 153 increases the sampling rate at which the sensor data acquisition section 152 acquires the respective sensor detection information items from the luminance distribution acquisition section 120 and the motion sensor 110, from the initial value of the sampling rate.

In a step S622, the determination section 154 acquires the time series luminance distribution information 302 and the time series motion sensor information 303, which have been accumulated in the accumulation area 143 of the system memory 141, as the input data.

In a step S623, the determination section 154 determines whether or not the respective directions in which the input data items (302 and 303) acquired in the step S622 have changed coincide with each other. If it is determined that the respective directions in which the input data items (302 and 303) have changed coincide with each other (a third condition is satisfied) (YES to the step S623), the process proceeds to the step S618. On the other hand, if it is determined that the respective directions in the changes do not coincide with each other (NO to the step S623), the process proceeds to a step S624.

In the step S624, the controller 153 determines, using the system timer 132, whether or not a predetermined time period has elapsed after it was determined in the step S601 that the power switch was in the off state. If it is determined that the predetermined time period has not elapsed (NO to the step S624), the process returns to the step S622. On the other hand, if it is determined that the predetermined time period has elapsed (YES to the step S624), the process proceeds to the step S609 to shift the power supply section 160 to the normal power-saving mode without performing learning.

As described above, the present embodiment has the estimation phase for inputting the time series luminance distribution information 302 and the time series motion sensor information 303 to the learned model 301 as the input data and determining whether an user operation of the digital camera 100 has been terminated or in progress. In this estimation phase, if it is determined that the user operation has been terminated, the digital camera 100 shifts to the power-saving mode.

Further, in the present embodiment, the additional learning process is executed by the learning section 155 after the estimation phase. This enables the learned model 301 to cope with a habit of each user, and the determination accuracy in the estimation phase is increased as the user continues using the digital camera 100, whereby it is possible to quickly shift the digital camera 100 to the power-saving mode without erroneous detection.

Although in the present embodiment, the determination section 154 executes the estimation process using the learned model 301 subjected to machine learning as the model data, a rule-based estimation process using a lookup table (LUT) or the like as the model data may be performed. In this case, for example, it is preferable to generate an LUT based on a relationship between the input data and the output data, in advance, and store the generated LUT in the memory 140. With this, the determination section 154 can acquire the output data by referring to the stored LUT and performing pattern matching. That is, in this case, the determination section 154 can use the LUT as a program that exhibits the same function as the learned model 301.

Note that the present embodiment can also be realized by supplying a program for realizing one or more functions to a computer of a system or apparatus via a network or a recording medium and performing a process for reading and executing the program by a system controller of the system or apparatus. The system controller includes one or more processors or circuits and may include a network of a plurality of separated system controllers or a plurality of separated processors or circuits to read out and execute an executable command.

The processor or circuit may include a central processing unit (CPU), a micro processing unit (MPU), a graphics processing unit (GPU), an application specific integrated circuit (ASIC), and a field programmable gate array (FPGA). Further, the processor or circuit may include a digital signal processor (DSP), a data flow processor (DFP), or a neural processing unit (NPU).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-104161, filed Jun. 23, 2021, which is hereby incorporated by reference herein in its entirety.

What is claimed is:

1. A terminal apparatus comprising:
    one or more processors;
    a luminance distribution acquisition unit configured to acquire luminance distribution around the terminal apparatus;
    a storage area for storing model data generated from time series information including the luminance distribution acquired by the luminance distribution acquisition unit;
    a determination unit configured to determine, based on the time series information and the model data, whether a user operation of the terminal apparatus has been terminated or in progress; and
    a power supply control unit configured to shift the terminal apparatus to a power-saving mode according to a result of the determination performed by the determination unit,
    wherein the luminance distribution acquisition unit, the determination unit, and the power supply control unit are implemented by the one or more processors.

2. The terminal apparatus according to claim 1, further comprising:
    a motion detection unit configured to detect motion of the terminal apparatus at the same time as the luminance distribution is acquired by the luminance distribution acquisition unit, and output the detected motion as motion information, and
    wherein the time series information further includes the motion information output by the motion detection unit, and
    wherein the motion detection unit is implemented by the one or more processors.

3. The terminal apparatus according to claim 2, further comprising:
    a generation unit configured to generate the time series information by periodically acquiring the luminance distribution from the luminance distribution acquisition unit and the motion information from the motion detection unit at a predetermined sampling rate, and
    a control unit configured to control the generation unit to increase the sampling rate for at least one of the luminance distribution acquisition unit and the motion detection unit in a case where a change equal to or larger than a predetermined threshold value occurs in the motion information output by the motion detection unit,
    wherein the generation unit and the control unit are implemented by the one or more processors.

4. The terminal apparatus according to claim 1, wherein the model data stored in the storage area is a learned model subjected to learning using the time series information as learning data, and data, as the teacher data associated with the learning data, which indicates whether or not a user operation of the terminal apparatus has been terminated or in progress during a time period in which the learning data has been acquired by the luminance distribution acquisition unit.

5. The terminal apparatus according to claim 4, further comprising an additional learning unit configured to perform additional learning of the learned model,
    wherein the additional learning unit is implemented by the one or more processors.

6. The terminal apparatus according to claim 5, wherein in a case where the time series information satisfies a first condition, and also no user operation of the terminal apparatus has been performed until a first time period elapses, the additional learning unit performs additional learning of the learned model, using the time series information as the learning data, and data indicating that the user operation of the terminal apparatus has been terminated, as the teacher data.

7. The terminal apparatus according to claim 5, wherein in a case where the time series information satisfies a second condition, and a user operation of the terminal apparatus has been performed before a second time period elapses, the additional learning unit performs additional learning of the learned model using the time series information as the learning data, and data indicating that the user operation of the terminal apparatus is in progress, as the teacher data.

8. The terminal apparatus according to claim 5, further comprising an operation unit configured to switch the terminal apparatus between a power-on state and a power-off state according to a user operation, and
    wherein when the operation unit switches the terminal apparatus from the power-on state to the power-off state according to the user operation, in a case where the time series information satisfies a third condition before a third time period elapses, the additional learning unit performs additional learning of the learned model using the time series information as the learning data, and data indicating that the user operation of the terminal apparatus has been terminated, as the teacher data, wherein the operation unit is implemented by the one or more processors.

9. The terminal apparatus according to claim 1, further comprising a display unit configured to perform surface light emission in a case where the terminal apparatus is in the power-on state and has not been shifted to the power-saving mode, and wherein the luminance distribution acquisition unit is arranged on the same surface as the display unit.

10. A method of controlling a terminal apparatus, comprising:

acquiring luminance distribution around the terminal apparatus;

storing model data generated from time series information including the acquired luminance distribution;

determining, based on the time series information and the model data, whether a user operation of the terminal apparatus has been terminated or in progress; and shifting the terminal apparatus to a power-saving mode according to a result of the determination.

11. A non-transitory computer-readable storage medium storing a program for causing a computer to execute a method of controlling a terminal apparatus, wherein the method comprises:

acquiring luminance distribution around the terminal apparatus;

storing model data generated from time series information including the acquired luminance distribution;

determining, based on the time series information and the model data, whether a user operation of the terminal apparatus has been terminated or in progress; and shifting the terminal apparatus to a power-saving mode according to a result of the determination.

* * * * *